United States Patent
Lee et al.

(10) Patent No.: US 9,575,600 B2
(45) Date of Patent: Feb. 21, 2017

(54) TOUCH PANEL AND A MANUFACTURING METHOD THEREOF

(71) Applicant: TPK Touch Solutions(Xiamen) Inc., Xiamen (CN)

(72) Inventors: Yuh-Wen Lee, Hsinchu (TW); Lichun Yang, Xiamen (CN); Chunyong Zhang, Xiamen (CN); Qiong Yuan, Nanchang (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 802 days.

(21) Appl. No.: 13/666,981

(22) Filed: Nov. 2, 2012

(65) Prior Publication Data

US 2014/0125597 A1 May 8, 2014

(30) Foreign Application Priority Data

Dec. 31, 2011 (CN) .......................... 2011 1 0461225

(51) Int. Cl.
*G06F 1/00* (2006.01)
*G06F 3/044* (2006.01)

(52) U.S. Cl.
CPC ..... *G06F 3/044* (2013.01); *G06F 2203/04103* (2013.01); *G06F 2203/04111* (2013.01); *Y10T 29/49117* (2015.01)

(58) Field of Classification Search
CPC ............ G06F 2203/04103; G06F 2203/04111; G06F 2203/04112
USPC ........................... 345/173, 174; 174/250, 255
See application file for complete search history.

(56) References Cited

U.S. PATENT DOCUMENTS

| | | | | |
|---|---|---|---|---|
| 5,216,490 A | * | 6/1993 | Greiff | B81B 3/0086 257/415 |
| 5,667,880 A | * | 9/1997 | Okaniwa | C03C 17/3417 359/359 |
| 2010/0149117 A1 | * | 6/2010 | Chien | G06F 3/0412 345/173 |
| 2010/0295819 A1 | * | 11/2010 | Ozeki et al. | 345/174 |
| 2011/0139516 A1 | * | 6/2011 | Nirmal | G06F 3/044 178/18.01 |
| 2011/0157086 A1 | * | 6/2011 | Ozeki et al. | 345/174 |
| 2011/0227858 A1 | * | 9/2011 | An et al. | 345/174 |
| 2011/0232947 A1 | * | 9/2011 | Fan | 174/255 |
| 2012/0118613 A1 | * | 5/2012 | Fan | 174/250 |
| 2012/0274602 A1 | * | 11/2012 | Bita | G02B 26/001 345/174 |

FOREIGN PATENT DOCUMENTS

TW M374618 U1 2/2010
TW 201035840 A1 10/2010

* cited by examiner

*Primary Examiner* — Michael Faragalla
(74) *Attorney, Agent, or Firm* — Cooper Legal Group, LLC

(57) ABSTRACT

A touch panel is provided in the present disclosure, comprising: a sensing patterned layer, comprising a plurality of first sensing electrode units not in contact with each other along first axis; and a bridging line, electrically connected with the adjacent first sensing electrode units along the first axis; wherein the bridging line are made by at least a metallic layer and a conductive oxidized layer. By this way, the touch panel lowers light reflection, thereby reducing flashes and bright-spots on the touch panel and improving appearance of the touch panel.

16 Claims, 6 Drawing Sheets

TOUCH PANEL AND A MANUFACTURING METHOD THEREOF

This application claims the benefit of Chinese application No. 201110461225.3 filed on Dec. 31, 2011.

BACKGROUND

Technical Field

The present disclosure relates to an input interface. More particularly the present disclosure relates to a touch panel and a method for manufacturing the same.

Description of the Related Art

A touch panel usually includes a substrate and sensing electrode units distributed interruptedly along first axis on the substrate and sensing arrays distributed along second axis on the substrate, wherein the sensing electrode units are actualized to be electrically connected via bridging bites and electrically insulated with the sensing arrays.

Since the surfaces of the bridging lines are usually made of highly reflective and opaque materials (such metals as aluminum, molybdenum), the bridging lines reflect lights to form a bright-spot area on the touch panel. When the touch panel is manipulated, the visual differences between the bridging area and the non-bridging area can be seen on the touch panel, thereby affecting visual effect of the appearance of the touch panel.

SUMMARY OF THE INVENTION

The present disclosure is to improve a bridging line with laminated structure of a metallic layer and a conductive oxidized layer so as to lower light reflection, thereby reducing flashes and bright-spots on touch panel and improving appearance of the touch panel.

In order to reach the foregoing and other purposes, the present disclosure provides a touch panel, comprising: a sensing patterned layer including a plurality of first sensing electrode units not in contact with each other along the first axis; and a bridging line electrically connected with the adjacent first sensing electrode units along the first axis; wherein the bridging line are made by at least a metallic layer and a conductive oxidized layer.

The present disclosure also provides a manufacturing method for a touch panel, comprising: forming a sensing, patterned layer, wherein the sensing patterned layer includes a plurality of first sensing electrode units not in contact with each other along first axis; and forming a bridging line to electrically connect with the adjacent first sensing electrode units; wherein the bridging line are made by at least a metallic layer and a conductive oxidized layer.

The approach of the present disclosure is to improve the bridging line with a laminated structure of a metallic layer and a conductive oxidized layer. So that the layers of the bridge line generate light interference effect with each other and the appearance of the bridge line is black or dark, thereby reducing the visibility of the bridge line. The bridging lines of the touch panel in the present disclosure can effectively lower reflection and get rid of flashes or bright-spots on the appearance of the touch panel. Therefore, the bridging lines of the touch panel in the present disclosure possess more favorable optical effect compared to the traditional structure.

For understanding more about the features and the technical contents of the present disclosure, please refer to the following detailed illustrations and attached drawings pertaining, to the present disclosure. However, the diagrams enclosed are only used for reference and illustration, but not for the limitation to the present disclosure.

BRIEF DESCRIPTION OF THE DRAWINGS

For those skilled in the art, numerous embodiments and drawings described below are for illustration purpose only and not to limit the scope of the present disclosure in any manner.

DETAILED DESCRIPTION OF THE EMBODIMENTS

Figure 1A:
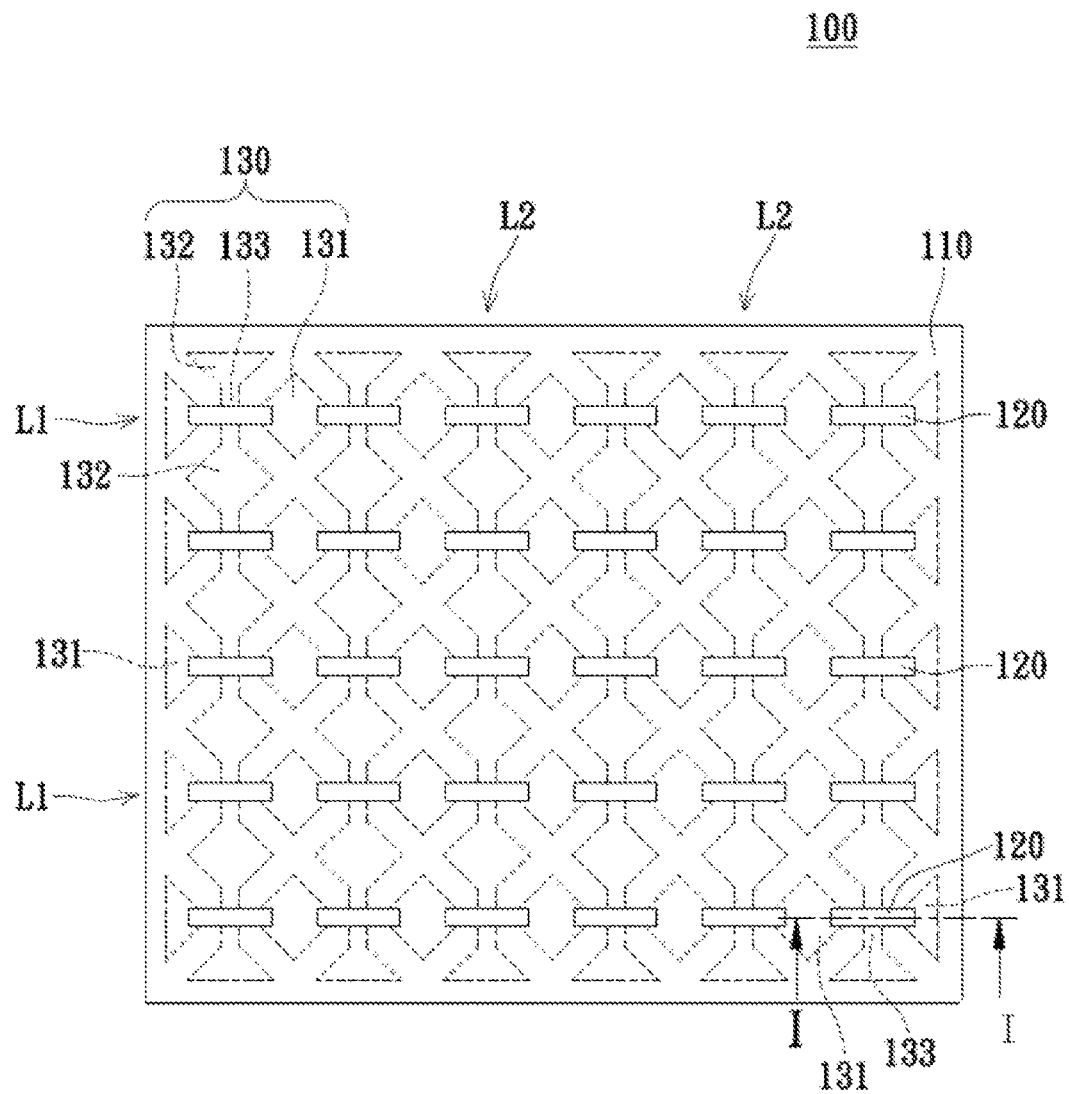
FIG. 1A is a top-view schematic diagram of a touch panel in accordance with the first embodiment of the present disclosure.
Figure 1B:
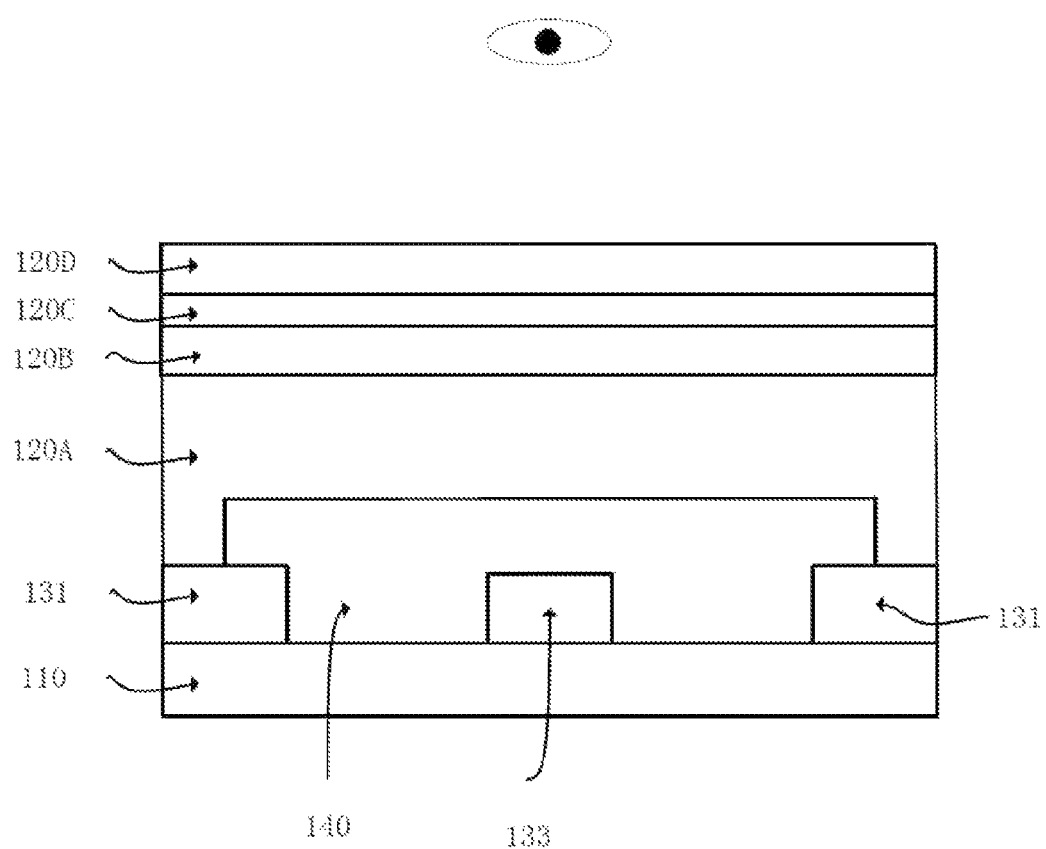
FIG. 1B is a cross-sectional schematic diagram shown in FIG. 1A along the cross-sectional line I-I.
Figure 1C:
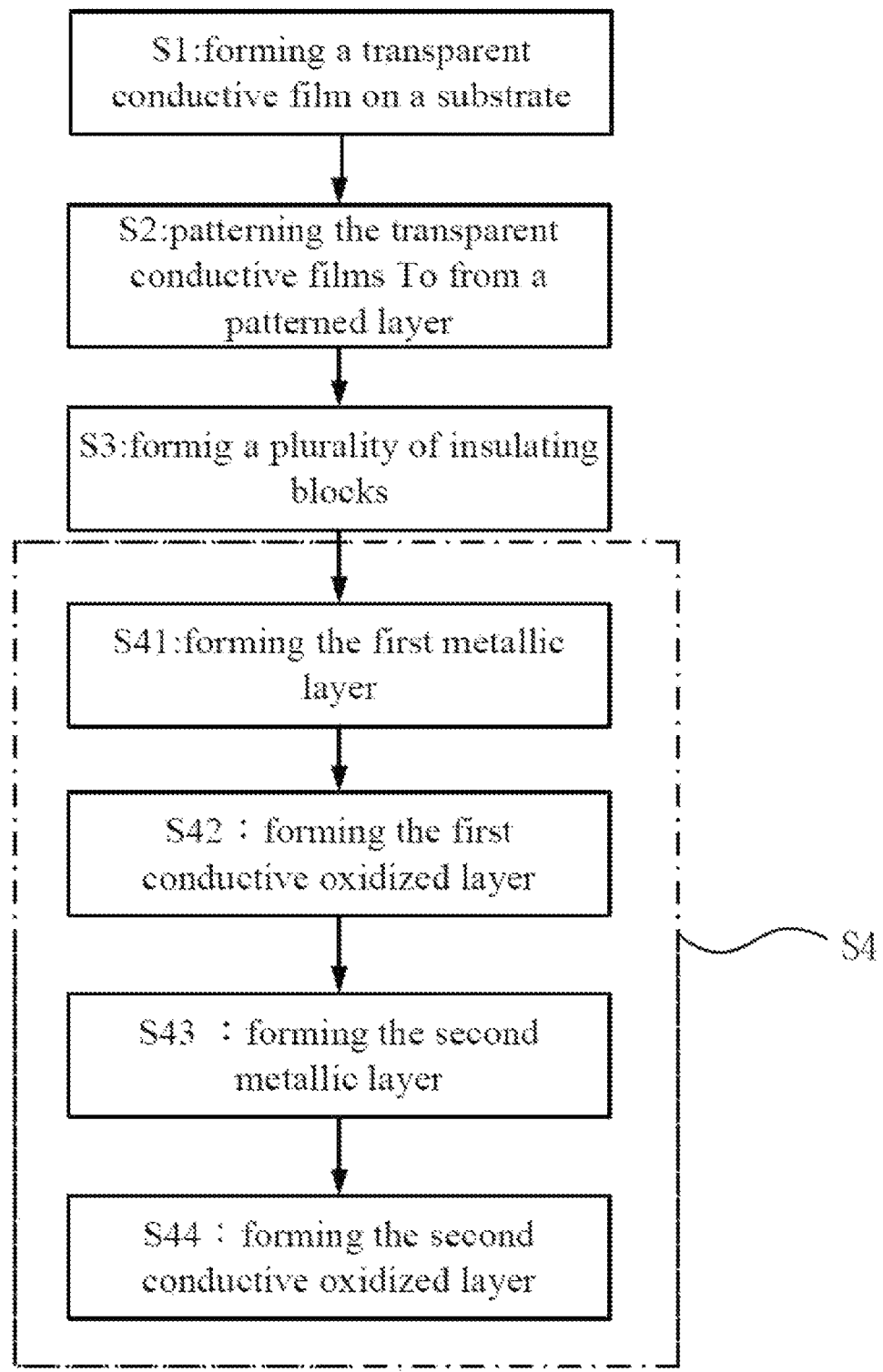
FIG. 1C is a flow chart of a manufacturing method for a touch panel in accordance with the first embodiment of the present disclosure.

FIG. 1A is a top-view schematic diagram of a touch panel in accordance with the first embodiment of the present disclosure, while FIG. 1B is a cross-sectional schematic diagram shown in FIG. 1A along the cross-sectional line I-I. FIG. 1C is a flow chart of a manufacturing method for touch panels in accordance with the first embodiment of the present disclosure. With reference to FIG. 1A and FIG. 1B, the touch panel 100 of the present embodiment includes a substrate 110, multiple bridging lines 120, and a sensing patterned layer 130. The sensing patterned layer 130 is disposed on the substrate 110, wherein the substrate 110 may be a glass plate or a transparent plastic sheet.

The sensing patterned layer 130 comprises multiple first sensing electrode units 131 distributed along first axis, multiple second sensing electrode its 132 distributed along second axis and multiple interconnecting parts 133. Wherein the first sensing electrode units 131, the second sensing electrode units 132 and the interconnecting pails 133 are disposed on the substrate 110. The bridging lines 120 are in connection between two adjacent lint sensing electrode units 131 to form multiple first sensing electrode arrays L1 paralleled with each other, whereas the various interconnecting parts 133 are in connection between two adjacent second sensing electrode units 132 to form multiple second sensing arrays L2 paralleled with each other, wherein the first sensing arrays L1 and the second sensing arrays L2 are electrically insulated from each other. The touch sensing panel 100 can further include an insulating block 140, wherein the insulating block 140 is disposed in space between the interconnecting part 133 and the bridging line 120 to reach the purpose of electrical insulation with each other. The first sensing arrays L1 and the second sensing arrays L2 are interlaced, wherein the various interconnecting parts 133 are located right below any one of the bridging lines 120. Therefore, the interconnecting parts 133 are respectively interlaced with the bridging lines 120. In addition, the sensing patterned layer 130 can be made of a transparent conductive film which may be indium tin oxide or indium zinc oxide, wherein the first sensing electrode units 131, the second sensing electrode units 132 and the interconnecting parts 133 can be formed by the said transparent conductive film via photolithography and etching.

The multiple bridging lines 120 are made by metallic layer and conductive oxidized layer overlapping and interlacing with each other in sequence, wherein the metallic layer far away from the person's eyes is the first metallic layer 120A electrically connected with the adjacent sensing electrode unit 131. The first conductive oxidized layer 120B covers the first metallic layer 120A, and the second metallic layer 120C covers the first conductive oxidized layer 120B, whereas the second conductive oxidized layer 120D covers the second metallic layer 120C. The first metallic layers 120A and the second metallic layers 120C are made of, but not limited to, at least one kind of gold, silver, copper, nickel, tungsten, aluminum, molybdenum, chromium or their alloys and their nitro-compound or their oxidized compound. The first conductive oxidized layer 120B and the second conductive oxidized layer 120D can be composed of, but not limited to, at least one kind of indium tin oxides, antimony tin oxides, ZnO, ZnO2, SnO2 or In2O2. The bridging lines 120 can be formed by performing the photolithography process and then performing the etching process.

Thickness of the first metallic layer 120A is 100 nm±20%. In a preferable embodiment, thicknesses of the first metallic layer 120A, the first conductive oxidized layer 120B, the second metallic layer 120C and the second conductive oxidized layer 120D are respectively 100 nm, 17 nm, 10 nm and 20 nm. Thickness of the first metallic layer 120A is larger than that of other layers. Dark metallic materials of black or dark gray color can be further chosen for the first metallic layer 120A to make transmittance of the said metallic layer lesser and enable the said metallic layer to absorb most of the hens entering into the lower side of the bridging lines so that the integral bridging lines present the effect of invisibility.

Please make further reference to FIG. 1C. The manufacturing method for touch panels in accordance with the first embodiment of the present disclosure comprises: S1, forming a transparent conductive film on the substrate 110; S2, patterning the transparent conductive films and forming multiple first sensing electrode units 131 distributed along the first axis, multiple second sensing electrode units 132 distributed along the second axis and multiple interconnecting parts 133; S3, forming a plurality of insulating blocks 140; S4, forming bridging lines 120 to electrically connect with the adjacent first sensing electrode units 131, wherein the bridging line 120 are made by at least a metallic layer and a conductive oxidized layer.

The said step S4 specifically includes: S41, forming the first metallic layer 120A electrically connected with the adjacent sensing electrode units 131; S42, forming the first conductive oxidized layer 120B covering the first metallic layer; S43, forming the second metallic layer 120C covering the first conductive oxidized layer 120B; S44, forming the second conductive oxidized layer 120D covering the second metallic layer 120C.

The traditional Mo—Al—Mo structure is abandoned and changed into the laminated structure of metallic layers and conductive oxidized layers for the bridging lines 120 of the touch panel in the present disclosure. For reducing the flashes and the bright spots on the appearance of the touch panel used and improving its appearance, the present disclosure makes the lights among the various layers generating the effect of interference and offsetting mutually, thereby rendering the integral bridging lines under the person's eyes presenting the effect of invisibility.

Figure 2A:
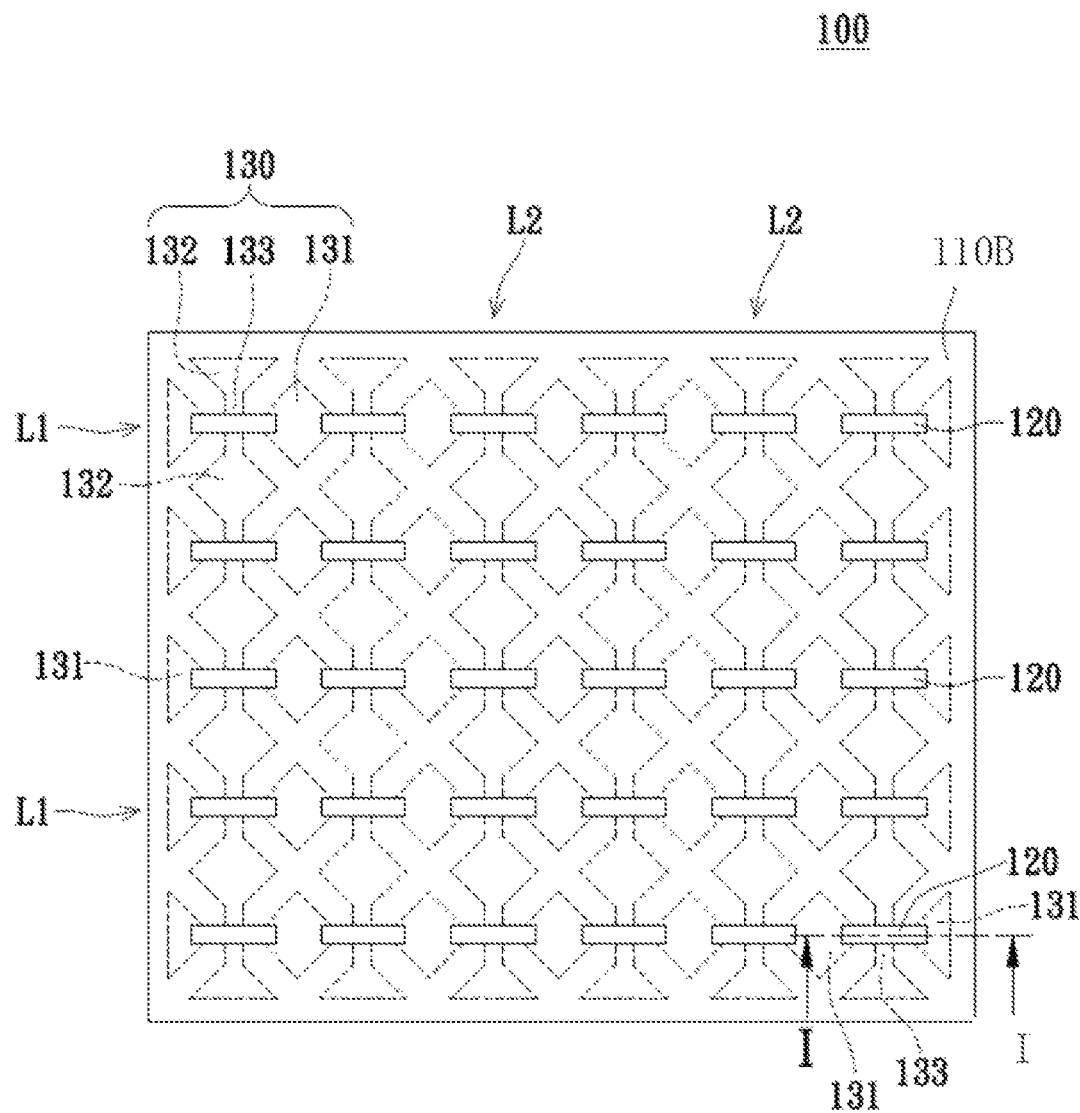
FIG. 2A is a schematic diagram of bridging lines of a touch panel in accordance with the second embodiment of the present disclosure.
Figure 2B:
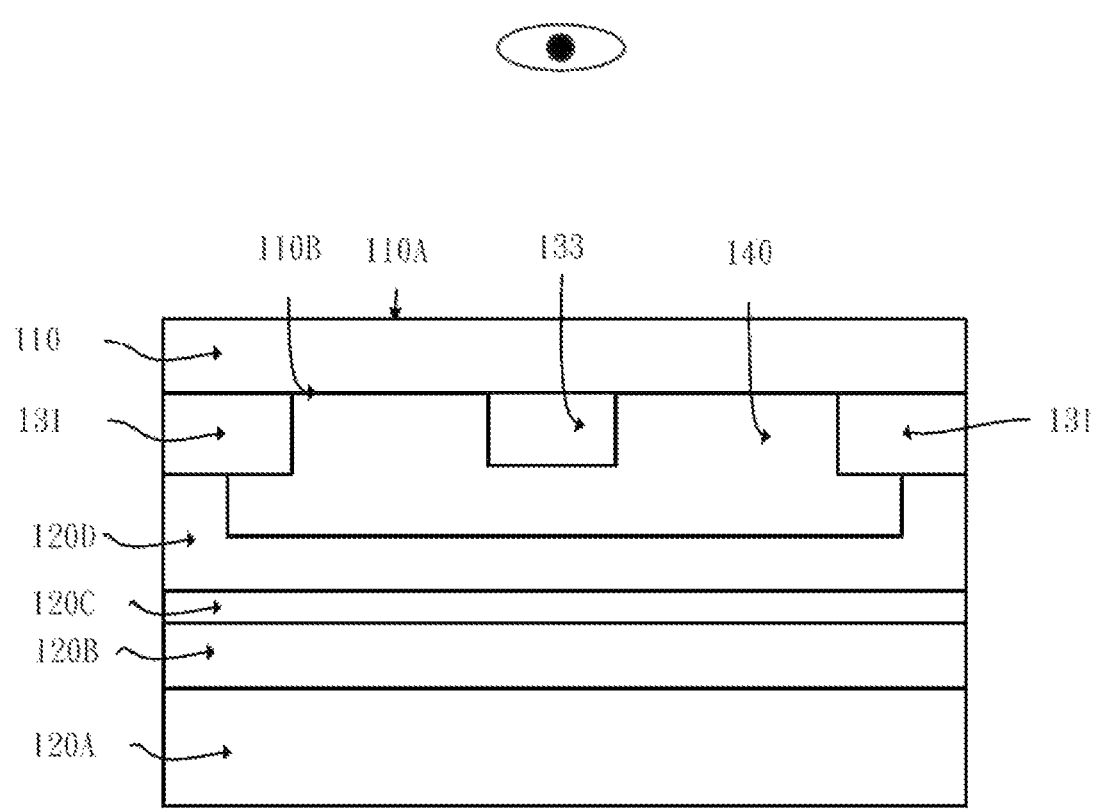
FIG. 2B is a flow chart of a manufacturing method for a touch panel in accordance with another embodiment of the present disclosure.

FIG. 2A is a schematic diagram in accordance with another embodiment of the present disclosure, in which the structure is similar to that of the foregoing embodiment and the identical components are symbolized with the same numbers. The difference in both the embodiments is that an upper surface 110A of a substrate 110 serves as a touch panel and a lower surface 110B series as a supporting plane for a sensing patterned layer 130. Bridging lines 120 of this embodiment are similarly separated into four layers; a metallic layer far away from the person's eyes is the first metallic layer 120A; a first conductive oxidized layer 120B covering the first metallic layer 120A; the second metallic layer 120C covering, the first conductive oxidized layer 120B; the second conductive oxidized layer 120D electrically connected with the adjacent sensing electrode unit 131 covering the second metallic layer 120C. The first metallic layer 120A and the second metallic layer 120C are composed of, but not limited to, at least one kind of gold, silver, copper, nickel, tungsten, aluminum, molybdenum, chromium or their alloys and their nitro-compound or their oxidized compound. The first conductive oxidized layer 120B and the second conductive oxidized layer 120D can be composed of, but not limited to, at least one kind of indium tin oxide, antimony tin oxide, ZnO, $ZnO_2$, $SnO_2$ or $In_2O_2$.

Figure 2C:
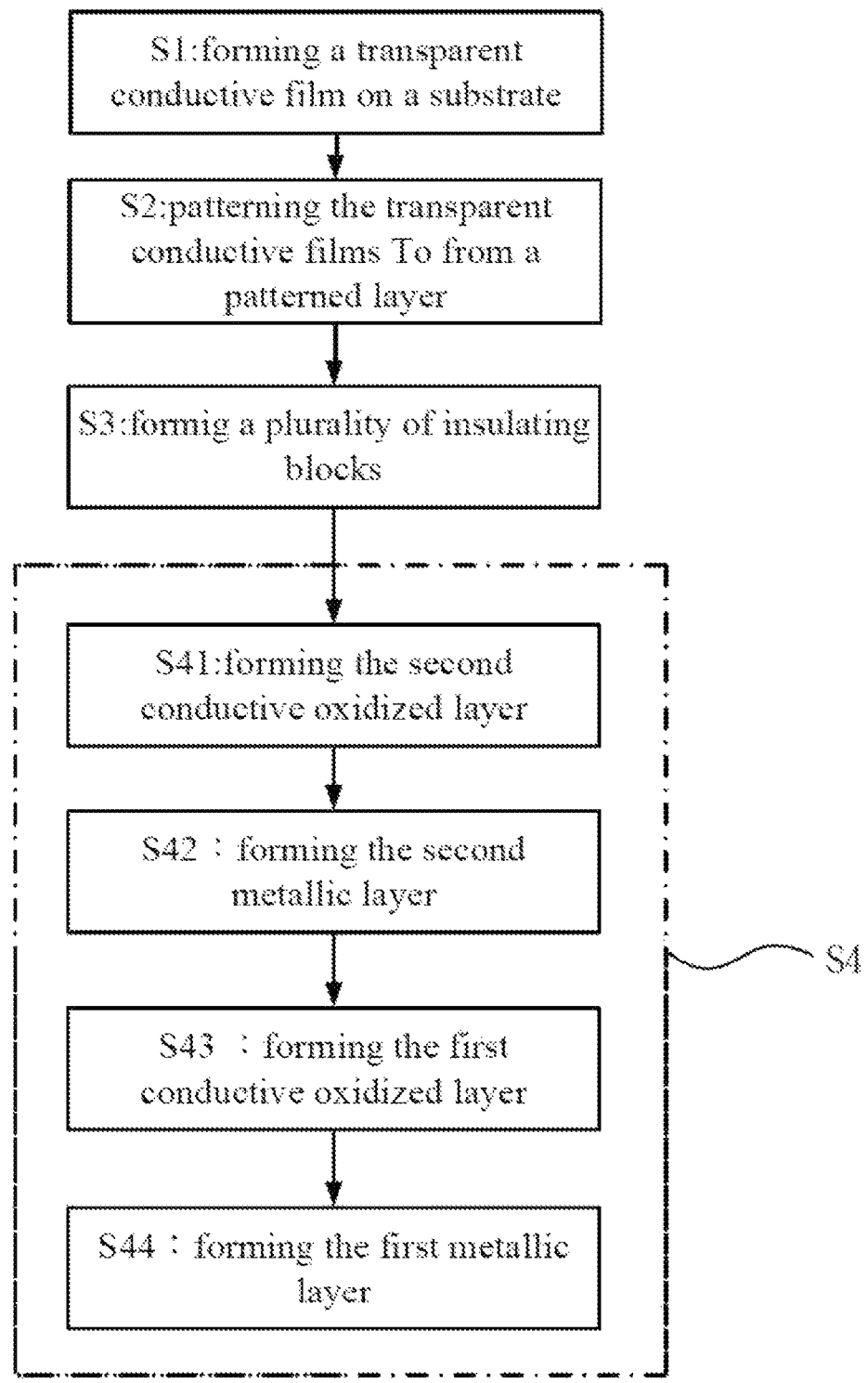
FIG. 2C is a flow chart of a manufacturing method for a touch panel in accordance with the second embodiment of the present disclosure.

FIG. 2C is a flow chart of a manufacturing method for touch panels in accordance with another embodiment of the present disclosure, wherein the manufacturing method is essentially identical to the first embodiment of the present disclosure, and the difference in both the embodiments lies in that Step S4 in the present embodiment includes: S41, forming the second conductive oxidized layer 120D electrically connected with the adjacent sensing electrode units 131; S42, forming the second metallic layer 120C covering the second conductive oxidized layer 120D; S43, forming the first conductive oxidized layer 120B covering the second metallic layer 120C; S44, forming the first metallic layer 120A covering the second metallic layer 120C.

Thickness of the first metallic layer 120A is larger than those of other layers. Dark metallic materials of black or dark gray color can be chosen for the first metallic layer to make it capable of absorbing most of the lights entering into the lower side of the bridging lines so that the integral bridging lines present the effect of invisibility.

In an embodiment, the bridging lines 120 present the black non-transparent effect by viewing, whether done from up to down or from down to up. Thereby, the bridging lines 120, used for a touch panel, can remove flashes and bright spots on an appearance and improve the appearance. Therefore, the present disclosure possesses more favorable optical effect compared to the traditional Mo—Al—Mo structure. Subsequently, the bridging lines 120 of the present disclosure can be rendered possessing the effect of integral invisibility by means of the laminated structure.

While certain embodiments have been shown and described, various modifications and substitutions may be made thereto without departing from the spirit and scope of the disclosure. Therefore, it is to be understood that the present disclosure has been described by way of illustration and not limitation.

What is claimed is:
1. A touch panel, comprising:
   a sensing patterned layer comprising:
      a plurality of first sensing electrode units not in contact with each other along a first axis; and a plurality of second sensing electrode units distributed along a second axis, wherein adjacent second sensing electrode units along the second axis are electrically connected via an interconnecting part;

a bridging line electrically connecting adjacent first sensing electrode units along the first axis, wherein the bridging line comprises:
a first metallic layer;
a first conductive oxidized layer covering the first metallic layer;
a second metallic layer covering the first conductive oxidized layer; and
a second conductive oxidized layer covering the second metallic layer; and an insulating block disposed between the first metallic layer and a first of the adjacent first sensing electrode units and between the first metallic layer and the interconnecting part and between the interconnecting part and the first of the adjacent first sensing electrode units.

2. The touch panel of claim 1, further comprising a substrate on which the sensing patterned layer is disposed.

3. The touch panel of claim 1, wherein the first metallic layer of the bridging line connects to the adjacent first sensing electrode units.

4. The touch panel of claim 1, wherein the first conductive oxidized layer of the bridging line connects to the adjacent first sensing electrode units.

5. The touch panel of claim 1, wherein the first sensing electrode units and the bridging line form a first sensing array, wherein the second sensing electrode units and the interconnecting part form a second sensing array, and wherein the first sensing array and the second sensing array are mutually insulated.

6. The touch panel of claim 5, wherein the insulating block is among a plurality of insulating blocks that insulate the first sensing array from the second sensing array.

7. The touch panel of claim 1, wherein the touch panel has at least one surface visible to human eyes, wherein the first metallic layer is further away from the at least one surface than the first conductive oxidized layer, the second metallic layer, and the second conductive oxidized layer, and wherein a thickness of the first metallic layer is larger than a thickness of the first conductive oxidized layer, a thickness of the second metallic layer, and a thickness of the second conductive oxidized layer.

8. The touch panel of claim 7, wherein the thickness of the first metallic layer is 100 nm±20%.

9. The touch panel of claim 1, wherein a color of the bridging line is black or dark gray.

10. The touch panel of claim 1, wherein the first conductive oxidized layer or the second conductive oxidized layer comprises indium tin oxide, antimony tin oxide, ZnO, $ZnO_2$, $SnO_2$, $In_2O_2$ or a combination thereof.

11. The touch panel of claim 1, wherein the first metallic layer or the second metallic layer is composed of one or more of gold, silver, copper, nickel, tungsten, aluminum, molybdenum, chromium or their alloys and their nitro-compounds or their oxidized compounds.

12. A manufacturing method for a touch panel, comprising:
forming a sensing patterned layer, wherein the sensing patterned layer comprises a plurality of first sensing electrode units not in contact with each other along a first axis, a plurality of second sensing electrode units distributed along a second axis, and a plurality of interconnecting parts;
forming a bridging line to electrically connect adjacent first sensing electrode units, wherein the bridging line comprises a first metallic layer, a first conductive oxidized layer, a second metallic layer, and a second conductive oxidized layer arranged in order; and
forming an insulating block between:
the first metallic layer and a first of the adjacent first sensing electrode units,
the first metallic layer and an interconnecting part of the plurality of interconnecting parts that is disposed between the adjacent first sensing electrode units, and
the interconnecting part and the first of the adjacent first sensing electrode units.

13. The manufacturing method for the touch panel of claim 12, wherein the first sensing electrode units and the bridging line form a first sensing array, wherein the second sensing electrode units and the interconnecting parts form a second sensing array, and wherein the first sensing array and the second sensing array are mutually insulated.

14. The manufacturing method for the touch panel of claim 13, wherein the insulating block is among a plurality of insulating blocks that insulate the first sensing array from the second sensing array.

15. The manufacturing method for the touch panel of claim 12, wherein the forming a bridging line comprises:
forming the first metallic layer to electrically connect with the adjacent first sensing electrode units;
forming the first conductive oxidized layer to cover the first metallic layer;
forming the second metallic layer to cover the first conductive oxidized layer; and
forming the second conductive oxidized layer to cover the second metallic layer.

16. The manufacturing method for the touch panel of claim 12, wherein the forming a bridging line comprises:
forming the second conductive oxidized layer to electrically connect with the adjacent first sensing electrode units;
forming the second metallic layer to cover the second conductive oxidized layer;
forming the first conductive oxidized layer to cover the second metallic layer; and
forming the first metallic layer to cover the first conductive oxidized layer.

* * * * *